United States Patent
Rius I Riu et al.

(10) Patent No.: US 8,848,811 B2
(45) Date of Patent: Sep. 30, 2014

(54) PRECODER FOR A COMMUNICATION SYSTEM AND METHODS USED IN SAID COMMUNICATION SYSTEM

(75) Inventors: Jaume Rius I Riu, Bromma (SE); Thomas Magesacher, Lund (SE); Per Ödling, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 816 days.

(21) Appl. No.: 13/058,330

(22) PCT Filed: Aug. 20, 2008

(86) PCT No.: PCT/SE2008/050937
§ 371 (c)(1), (2), (4) Date: Sep. 1, 2011

(87) PCT Pub. No.: WO2010/021575
PCT Pub. Date: Feb. 25, 2010

(65) Prior Publication Data
US 2011/0305267 A1    Dec. 15, 2011

(51) Int. Cl.
H04L 27/28 (2006.01)
H04L 25/03 (2006.01)

(52) U.S. Cl.
CPC . *H04L 25/03343* (2013.01); *H04L 2025/03414* (2013.01); *H04L 25/03159* (2013.01)
USPC .......................... 375/260; 375/227

(58) Field of Classification Search
CPC ............. H04L 25/03343; H04L 25/03159; H04L 2025/03414; H04L 1/0076; H04L 1/0026; H04L 25/4975; H04B 7/0452; H04B 7/0626; H04B 7/0632; H04B 7/0654; H04B 7/0663; H04B 7/0417
USPC ......................................... 375/260, 227, 285
See application file for complete search history.

(56) References Cited

U.S. PATENT DOCUMENTS 6,314,135 B1 * 11/2001 Schneider et al. ............ 375/232
6,411,657 B1 * 6/2002 Verbin et al. ................. 375/285
(Continued)

FOREIGN PATENT DOCUMENTS

| EP | 1876742 A1 | 1/2008 |
| JP | 2003-134086 A | 5/2003 |
| WO | 2006137375 A1 | 12/2006 |

OTHER PUBLICATIONS

Japanese Office Action, mailed Feb. 12, 2013, in connection with Japanese Patent Application No. 2011-523768 (see translation below).
(Continued)

*Primary Examiner* — Shuwang Liu
*Assistant Examiner* — Helene Tayong
(74) *Attorney, Agent, or Firm* — Leffler Intellectual Property Law, PLLC

(57) ABSTRACT

The present invention relates to a precoder for a communication system arranged to provide transmission blocks for transmission over a transmission channel based on inputted symbol blocks. The precoder is arranged to pre-distort each symbol block based on an estimate of the characteristics of the transmission channel so that the corresponding transmission block appears to be undistorted after transmission over the transmission channel. In accordance therewith, the precoder is arranged to apply Tomlinson-Harashima precoding on a sum of a first measure corresponding to predistortion so as to remove intrasymbol interference and a second measure corresponding to predistortion so as to remove intersymbol interference. The present invention further relates to a method for providing transmission blocks for transmission over a transmission channel in a communication system.

20 Claims, 3 Drawing Sheets

(56) References Cited

U.S. PATENT DOCUMENTS

| | | | |
|---|---|---|---|
| 7,664,200 B2* | 2/2010 | Ariyavisitakul et al. | 375/296 |
| 7,769,100 B2* | 8/2010 | Cheong et al. | 375/285 |
| 2006/0140298 A1 | 6/2006 | Dowling | |
| 2009/0274239 A1* | 11/2009 | Efimov et al. | 375/285 |
| 2010/0074364 A1* | 3/2010 | Kwon et al. | 375/285 |

OTHER PUBLICATIONS

Translation of Japanese Office Action, mailed Feb. 12, 2013, in connection with Japanese Patent Application No. 2011-523768.

PCT International Search Report, dated May 18, 2009, in connection with International Application No. PCT/SE2008/050937.

PCT Written Opinion, dated May 18, 2009, in connection with International Application No. PCT/SE2008/050937.

International Preliminary Report on Patentability, dated Oct. 5, 2010, in connection with International Application No. PCT/SE2008/050937.

Tomlinson, M. "New automatic equaliser employing modulo arithmetic," Electronics Letters, vol. 7, No. 5, pp. 138-139, Mar. 25, 1971.

Harashima, H. et al. "Matched-Transmission Technique for Channels with Intersymbol Interference", IEEE Transactions on Communications, vol. 20, No. 4, pp. 774-780, Aug. 1972.

Yu, Fu et al. "A Technique for Multiuser and Intercarrier Interference Reduction in Multiple-Antenna Multiuser OFDM Downlink", IEEE Transactions on Wireless Communications, vol. 6, No. 10, pp. 3493-3497, Oct. 2007.

Yuping, Z. et al. "Intercarrier interference self-cancellation scheme for OFDM mobile communication system", IEEE Transactions on Communications, vol. 49, No. 7, pp. 1185-1191, Jul. 2001.

Czylwik, A. "Degradation of multicarrier and single carrier transmission with frequency domain equalization due to pilot-aided channel estimation and frequency synchronization", Global Telecommunications Conference, Nov. 3-8, 1997, IEEE, vol. 1, no., pp. 27-31.

Cheong, K. et al. "Precoder DMT with insufficient cyclic prefix" in Proceedings of IEEE International Conference on Communications, 1998, vol. 1, pp. 339-343.

Liavas, A. "Tomlinson-Harashima Precoding with Partial Channel Knowledge", IEEE Transactions on Communications, vol. 53, No. 1, pp. 5-9, Jan. 2005.

* cited by examiner

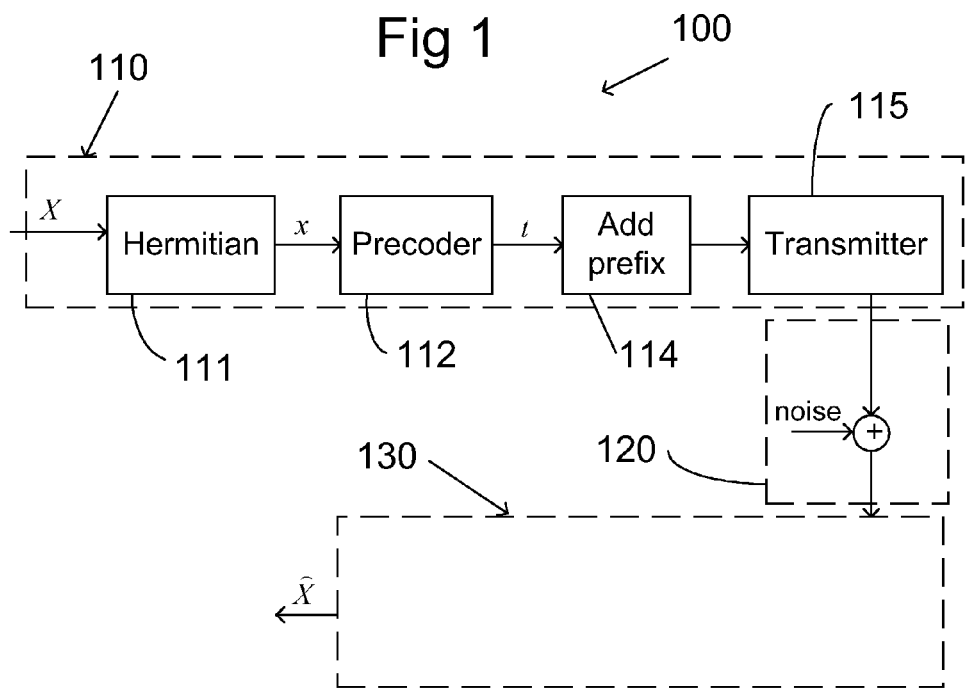
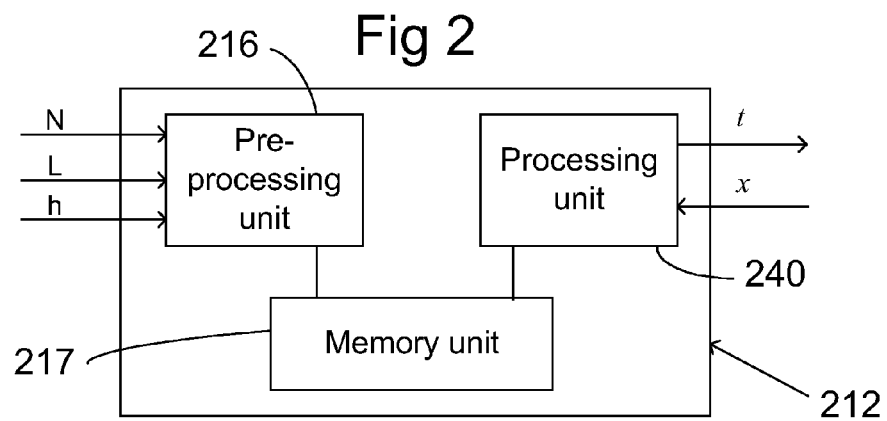
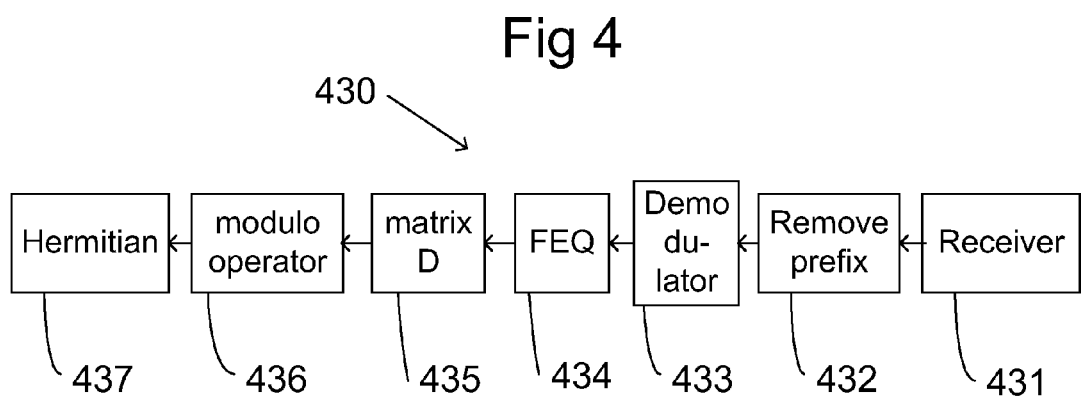

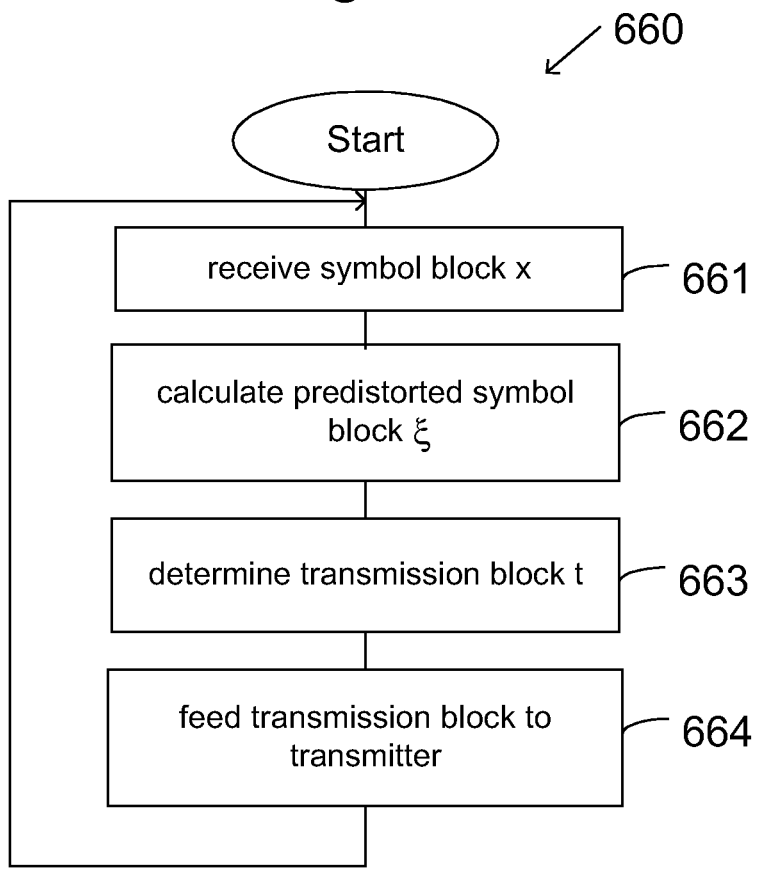

PRECODER FOR A COMMUNICATION SYSTEM AND METHODS USED IN SAID COMMUNICATION SYSTEM

TECHNICAL FIELD

The present invention relates to the field of precoding transmission blocks in communication systems.

BACKGROUND

In telecommunications, transmissions are often performed by means of block transmission schemes. It is then common to use guard intervals (GI) to ensure that distinct blocks do not interfere with one another. The guard intervals are for example cyclic prefixes, zero-paddings, or pseudo-noise sequences.

The use of guard intervals combats intersymbol interference and intercarrier interference. In the guard interval, no or only redundant information is transmitted. This seriously limits the spectral efficiency of block transmission schemes. For example, a telecommunication system with a guard interval whose length is a quarter of the block length, 20% of the time (and thus of the achievable throughput) is wasted.

"Precoder for DMT with insufficient cyclic prefix" in Proc. IEEE International Conference on Communications, 1998, vol. 1, pp. 339-343 by Kok-Wui Cheong and J. M. Cioffi describes the introduction of a precoder at the transmitter intended to reduce distortions due to insufficient length of the cyclic prefix used in the guard interval. The precoder is arranged to reduce the distortion by processing the signals at the transmitter such that the signals appear to be undistorted at the receiver.

SUMMARY

It is one object of the present invention to improve the precoder so as to be able to at least reduce the required Guard Interval.

This has in one example been achieved by means of a precoder for a communication system arranged to provide transmission blocks for transmission over a transmission channel based on inputted symbol blocks. The precoder is arranged to pre-distort each symbol block based on an estimate of the characteristics of the transmission channel so that the corresponding transmission block appears to be undistorted after transmission over the transmission channel. The precoder is arranged to provide said predistortion by applying Tomlinson-Harashima precoding on a sum of a first measure corresponding to predistortion so as to remove intrasymbol interference and a second measure corresponding to predistortion so as to remove intersymbol interference.

Because both predistortion so as to remove intrasymbol interference and predistortion so as to remove intersymbol interference is accomplished with the Tomlinson-Harashima-based precoding, the precoder allows for ISI/ICI-free block transmission. Thereby the need for a Guard Interval can even be eliminated entirely. The precoder allows for low-latency (short block length) high-data rate block transmission over media with severe dispersion. The precoding allows instantaneous symbol decisions of the receiver, which greatly simplifies the application of channel coding schemes.

In one example, each symbol block is within a predetermined range and the precoder is arranged to predistort each symbol block based on the Tomlinson-Harashima precoding so as to map the thus provided transmission block $t^{(i)}$ into the predetermined range.

The second measure is in one example based on an intersymbol interference measure ($P_{isi}$) for the transmission channel and a preceding transmission block.

The first measure is in one example based on an intrasymbol measure ($P_{ici}$) and the inputted symbol block. The first measure is for example based on a matrix decomposed from the intrasymbol measure ($P_{ici}$) and on the inputted symbol block.

In one example, the precoder is arranged to recursively calculate for each inputted symbol block ($x^{(i)}$) an intermediate symbol block ($\xi$) as $$\xi(k) \triangleq \mathrm{mod}_M(R(k,k:N)\xi(k:N)+q(k))-R(k,k+1:N)\xi(k+1:N)-q(k),$$

wherein the intermediate symbol block ($\xi$) is initially assigned to the value of the inputted symbol block ($x^{(i)}$) or the like. The precoder can then be arranged to determine each transmission block $t^{(i)}$ based on the intermediate symbol block ($\xi$) and based on a transposed modulation matrix.

The precoder comprises in one example a pre-processing unit arranged to determine the intersymbol interference measure ($P_{ici}$) and the intrasymbol interference measure ($P_{ici}$). The pre-processing unit is then arranged to decompose the intrasymbol interference measure ($P_{ici}$) into a plurality of matrices (Q, R, D), wherein at lest one of the matrices is used in pre-distorting the symbol blocks.

One advantage of using at least one of said matrices in the precoder is that it does not require the calculation of an inverse matrix so as to provide the "predistortion" to the signals. The application of an inverse matrix may result in large transmit power; the power required depends on the channel realization at hand. The precoding matrices are herein instead provided using linear matrix operations.

One first matrix (R) is in one example an upper triangular matrix. The pre-processing unit can be arranged to decompose the intrasymbol interference measure ($P_{ici}$) into a at least three matrices (Q, R, D), wherein one second matrix (Q) is unitary and one third matrix (D) is diagonal.

The present invention relates further to a transmitter part for a communication system comprising a precoder according to the above.

The present invention further relates to a communication system comprising a transmitter part according to the above. In one example, the communication system comprises further a receiver arranged to provide decoded symbol blocks based received transmission blocks transmitted over the transmission channel.

The receiver can be arranged to calculate each decoded symbol block as $$\hat{x}(k) \triangleq \mathrm{mod}_M(Py)(k)$$

wherein $\mathrm{mod}_M$ is the Tomlinson-Harashima precoding ($\mathrm{mod}_M$) operator, and wherein P is based on an intrasymbol interference measure ($P_{ici}$) for the transmission channel (120).

In a case wherein the communication system is a multicarrier system, the receiver P can be defined as P=D E W, wherein D is based on an intrasymbol interference measure ($P_{ici}$) for the transmission channel (120), E is an equalizer and W is a modulation matrix such as the normalized DFT matrix. D is for example a diagonal matrix.

In a case, wherein the communication system is a single carrier communication system, P can defined as P=D $W^H$ E W, wherein D is based on an intrasymbol interference measure ($P_{ici}$) for the transmission channel (120), E is an equalizer and W is a modulation matrix such as the normalized DFT matrix. D is for example a diagonal matrix.

The present invention also relates to a receiver for a communication system arranged to provide decoded symbol blocks based received transmission blocks ($y^{(t)}$) transmitted over a transmission channel. The receiver is arranged to calculate each decoded symbol block as $\hat{x}(k) \triangleq \mathrm{mod}_M(Py)(k)$, wherein $\mathrm{mod}_M$ is the Tomlinson-Harashima precoding operator, and wherein P is based on an intrasymbol interference measure for the transmission channel.

The present invention also relates to method a method for providing transmission blocks for transmission over a transmission channel in a communication system. The method comprises steps of receiving inputted symbol blocks and pre-distorting the received symbol blocks. The received symbol blocks each are within a predetermined range. The pre-distortion is performed based on an estimate of the characteristics of the transmission channel so that the corresponding transmission block appears to be undistorted after transmission over the transmission channel. The predistortion comprises applying Tomlinson-Harashima precoding on a sum of a first measure corresponding to predistortion so as to remove intrasymbol interference and a second measure corresponding to predistortion so as to remove intersymbol interference.

BRIEF DESCRIPTION OF THE DRAWINGS

FIG. 1 is a block scheme schematically showing an example of a communication system.

FIG. 2 is a block scheme showing an example of a precoder in a transmitter part of the communication system of FIG. 1.

FIG. 4 is a block scheme showing an example of a receiver part in the communication system of FIG. 1.

FIG. 6 is a flow chart, schematically illustrating a method performed for runtime transmit processing.

DETAILED DESCRIPTION

Figure 3:
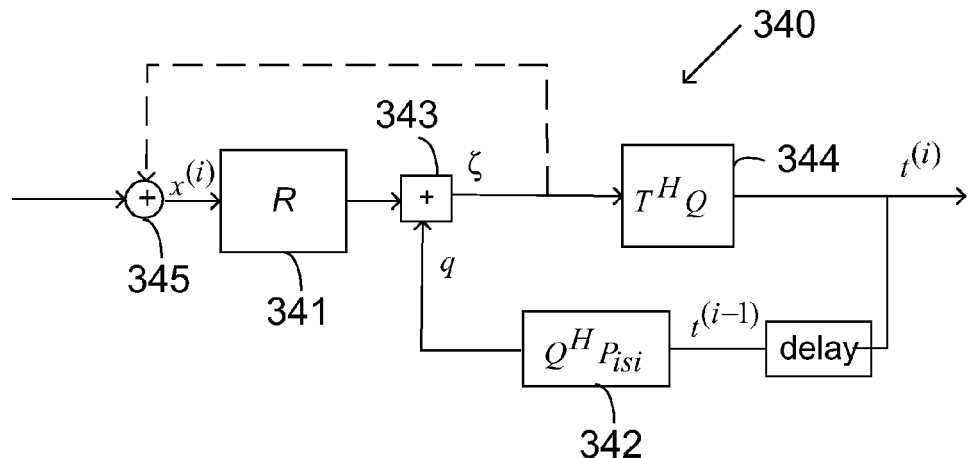
FIG. 3 shows an example of an operational scheme schematically indicating the operation of a processing unit in the precoder of FIG. 2.

In FIG. 1, a communication system 100 is depicted. The communication system is in one example a multicarrier system such as OFDM/DMT. The multicarrier system is one example designed for wireless transmission such as WLAN, WiMAX, LTE, or for wireline transmission (xDSL), or for transmission over optical fibres. In an alternative example, the communication system is a guard interval based single carrier system, often also referred to as a frequency-domain equalized system.

The communication system 100 comprises a transmitter part 110, a transmission channel 120 and a receiver part 130. The transmitter part 110 is arranged to receive input signals. The communication system will in the following be described with reference to a multicarrier system. In a frequency domain equalized single carrier system, there is no such notation as time domain and frequency domain in the transmitter. In the multicarrier system, each input signal is a frequency domain representation of a symbol block X which is to be transmitted over the transmission channel 120. The length of each symbol block is N. The transmitter part 110 is arranged to process each symbol block so as to provide as an output a corresponding transmission block t to the transmission channel 120.

The transmitter part 110 comprises in the shown example a Hermitian operator unit 111 arranged to receive the input signal in the form of a symbol block X and provide an output signal x, which obeys Hermitian symmetry (and consequently ensures a real-valued transmit signal t). The Hermitian operator 111 is known in the art and will not be described in detail herein. In one example, wherein the communication system is a DMT system, the Hermitian operator unit is arranged to provide a real-valued baseband transmit signal. Alternatively, the Hermitian operator is omitted. In one example, the Hermitian operator unit 111 is omitted in a OFDM system. In the illustrated example, comprising the Hermitian operator unit 111, the output from the Hermitian operator unit 111 is fed to a precoder 112 of the transmitter part 110. In an alternative example, wherein the Hermitian operator unit 111 is omitted, the input signal is directly provided to the precoder 112.

The precoder 112 is arranged to provide time domain transmission blocks t for transmission over the transmission channel 120. The precoder will be described more in detail below. The precoder 112 is in the shown example arranged to output the time domain signal transmission blocks to a unit 114 arranged to add a prefix or the like to the transmission blocks so as to provide a Guard Interval (GI). In one alternative example, the unit 114 arranged to add a prefix is omitted. The transmission blocks t provided by the precoder 112 and possibly provided with an associated prefix are fed to a transmitter 115. In one example, the transmitter comprises a parallel-to-serial converter (not shown) arranged to output the data of the transmission blocks t (possibly provided with an associated prefix) as a serial stream to an antenna for further transmission over the transmission channel 120.

The transmission channel 120 comprises for example a dispersive media such as an air interface. The dispersive media causes inter-block-interference (herein referred to as inter-symbol-interference) and intra-block-interference. In multicarrier systems, the intra-block-interference is often referred to as inter-carrier-interference. For blocked single carrier systems, there is no such notation as 'subcarriers'; the intra-block-interference may for example be referred to as linear distortion. Noise is added to the transmission blocks t over the transmission channel 120. The dispersive transmission channel 120 is modelled by a channel impulse response herein denoted h. The receiver part 130 will be described more in detail below.

In FIG. 2, the precoder 212 comprises a pre-processing unit 216 arranged to calculate pre-stored data. The pre-processing unit 216 is connected to a memory unit 217. The precoder 212 comprises further a processing unit 240 connected to said memory unit 217.

The pre-processing unit 216 is arranged to calculate a first measure $P_{ici}$ of an inter-carrier interference associated to the transmission channel 120. The intercarrier interference measure $P_{ici}$ is computed as:

$$P_{ici} \triangleq TH^{-1}\tilde{H}T^H,$$

wherein
T is a modulation matrix. In detail, the modulation matrix T is for example a DFT matrix (possibly normalized) for a multicarrier system. In a single carrier system, the modulation matrix T is for example the identity matrix. The matrix $T^H$ denotes the transposed conjugate of the modulation matrix T.

H is a linear convolution matrix based on the impulse response h of the transmission channel 120 (possibly including a cyclic prefix of length L), and $\tilde{H}$ is a circular convolution matrix based on the impulse response h of the transmission channel 120.

The linear convolution matrix H for L=0 (no prefix) can in detail be written as $H(k,l)=h_{k-l}$, $k,l \in 1, \ldots, N$, wherein N is the block length of the symbol blocks (without any prefixes). The matrix H can be straightforwardly modified to include a prefix of any kind (for example, cyclic, all-zero, pseudo random, etc.) of length L. The matrix $H^{-1}$ is the inverse of the convolution matrix H.

The circular convolution matrix can in detail be written as $$\tilde{H}(k,l) = h_{mod(k-l,N)}, k, l \in 1, \ldots, N,$$

wherein mod(a,b) is an ordinary modulo-b operation of a.

The pre-processing unit 216 is further arranged to calculate a second measure $P_{isi}$ of intersymbol interference caused by the transmission channel 120. The intersymbol interference measure $P_{isi}$ is calculated as:

$$P_{isi} \triangleq -TH^{-1}\hat{H},$$

wherein $$\hat{H}(k,l) = \begin{cases} h_{mod(k-l,N)+L}, & k \in 1, \ldots, N, l \in k+1, \ldots, N \\ 0 & \text{otherwise} \end{cases}$$

The pre-processing unit is further arranged to decompose the intercarrier interference measure $P_{ici}$ into matrices Q, R and D, wherein Q is unitary (i.e. $Q^{-1}=Q^H$), R is an upper triangular matrix with ones the main diagonal and D is a diagonal matrix. Thus, the pre-calculation unit is arranged to calculate the matrices Q, R and D as $$QRD \triangleq P_{ici}$$

Methods which can be used for determining the values of the matrices Q, R and D are known in the art. For example, an iterative method is used in determining the matrices Q, R and D.

Accordingly the pre-processing unit 216 is arranged to calculate the intercarrier interference measure $P_{ici}$, and the intersymbol interference measure $P_{isi}$, and the matrices Q, R and D based on the intercarrier interference measure $P_{ici}$. The pre-processing unit 216 is arranged to feed the intercarrier interference measure $P_{ici}$, the intersymbol interference measure $P_{isi}$ and the matrices Q, R and D to the memory unit 217. Input data to the pre-processing unit 216 for performing the above described calculations is in the herein described example the impulse response h of the channel, the length N of the blocks and the length L of the prefix. The coherence time of the channel provides a decision parameter for the updating frequency of the intercarrier interference measure $P_{ici}$, the intersymbol interference measure $P_{isi}$, and accordingly, the matrices Q, R and D. Thus, if the transmission channel is time varying, the estimate of the impulse response h may be updated and the intercarrier interference measure $P_{ici}$, the intersymbol interference measure $P_{isi}$ and the matrices Q, R and D may be recalculated based on the time varying characteristics of the transmission channel 120.

In FIG. 3, the processing unit 340 is arranged to receive a symbol block $x^{(i)}$ having the length N. The processing unit 340 is then arranged to compute transmit block No. i denoted $t^{(i)}$ and to output said transmit block $t^{(i)}$. In detail, the transmit block $t^{(i)}$ is computed in accordance with the following.

A first intermediate is assigned as $$\xi \triangleq x^{(i)}.$$

A second intermediate is computed as $$q \triangleq Q^H P_{isi} t^{(i-1)}.$$

wherein $t^{(i-1)}$ is the preceding transmission block.

Then, the first intermediate is modified in accordance with the principles below.

The values $\xi(k)$ are computed sequentially starting with k=N down to k=1. When computing $\xi(k)$, the elements $\xi(k+1:N)$ already contain properly precoded values computed in previous steps. The value for $\xi(k)$ is computed as $$\xi(k) \triangleq \text{mod}_M(R(k,k:N)\xi(k:N)+q(k))-R(k,k+1:N)\xi(k+1:N)-q(k), \text{ wherein } k=N:-1:1$$

In normal wording, the precoding can be interpreted as follows. First, $R(k,k:N)\xi(k:N)$ is computed, which corresponds to linear predistortion in order to remove intra-block-interference such as intercarrier interference. Then, q(k) is added, which corresponds to linear distortion so as to remove inter-symbol interference.

The modulo operator $\text{mod}_M$, which is arranged to operate on the sum $R(k,k:N)\xi(k:N)+q(k)$ maps the precoded symbol block into a predetermined range [−M, M]. The modulo operator $\text{mod}_M$ is herein referred to as Tomlinson Harashima precoding. M represents the symbol size per dimension (e.g. M=2 for QPSK). For the sake of simple notation, we consider only square constellations of equal size for all carriers (in a multicarrier system) or for all symbols (in a blocked single carrier system). Extensions for most non-square alphabets and different alphabet sizes on different carriers or symbols are straightforward. The modulo operator $\text{mod}_M$ is in one example defined as $$\text{mod}_M(x) = \text{mod}(\Re(x)+M;2M)-M+j(\text{mod}(\Im(x)+M;2M)-M)$$

Finally, a vector $\xi$ is determined, that yields a linearly precoded symbols in the range [−M, M]. Accordingly, $\xi$ is obtained by finally removing the component q(k), which corresponds to linear distortion that eliminates intersymbol interference and by removing $R(k,k+1:N)\xi(k+1:N)$, which corresponds to the linear distortion that eliminates intercarrier interference.

FIG. 3 tries to illustrate the above described procedure performed by the processing unit 340, even though the recursive computation defined by the equations above performed by the processing unit can not be fully described by a simple figure. In the figure, a first computation unit 341 is arranged to perform the above described multiplying computation $R(k,k:N)\xi(k:N)$. Further, a second computation unit 342 is arranged to calculate the second inter-mediate $q \triangleq Q^H P_{isi} t^{(i-1)}$. A third computation unit 343 is arranged to add the outputs from the first and second computation units 341, 342 in the recursive modulo fashion described above. Finally, a fifth computation unit 345 is arranged to remove the components corresponding to linear distortion so as to yield the vector $$\xi(k) \triangleq \text{mod}_M(R(k,k:N)\xi(k:N)+q(k))-R(k,k+1:N)\xi(k+1:N)-q(k), \text{ where}$$

k=N:−1:1. A fourth computation unit 344 is arranged to calculate the transmission block $t^{(i)}$ based on the output from the third computation unit 343. In one example, the transmission block $t^{(i)}$ is computed as $$t^{(i)} \triangleq T^H Q(R\xi+q)$$

The transmission block $t^{(i)}$ is then fed to the unit 114 arranged to add a prefix or the transmitter 115, as discussed in relation to FIG. 1. The transmission block $t^{(i)}$ is further in the illustrated example fed to the second calculation unit 342 arranged to calculate the second intermediate q. In one example, the second intermediate q is based on the transmission block $t^{(i)}$ modified with information related to the intersymbol interference measure $P_{isi}$. In one example, the second intermediate q is calculated as $$q \triangleq Q^H P_{isi} t^{(i-1)}$$

In FIG. 4, the receiver part 430 is arranged to carry out modulo decisions so as to provide estimated symbol blocks $\hat{x}^{(i)}$ based on received transmission blocks $y^{(i)}$. The receiver part 430 comprises in one example a receiving unit 431 arranged to receive the transmission blocks $y^{(i)}$ transmitted over the transmission channel 120. The receiver part 430 comprises in one example a serial-to-parallel converter (not shown) arranged to form the serially received data of the transmission blocks $y^{(i)}$ into vectors, each having a size N equal to the size of the transmitted transmission blocks $t^{(i)}$. The receiver part 430 comprises in the illustrated example a unit 432 for removing the prefix, if any, from each received transmission block $y^{(i)}$. If the received transmission blocks $y^{(i)}$ comprise no prefixes, the unit 432 for removing prefixes is superfluous. A demodulator unit 433 is arranged to operate on the received blocks $y^{(i)}$ so as to provide a transformation of the blocks to the frequency domain. In a multicarrier system, the demodulator unit 433 comprises for example a DFT matrix preferably implemented as FFT operation arranged to operate on the received transmission blocks $y^{(i)}$. In a blocked single-carrier system, the demodulator comprises for example the identity matrix arranged to operate on the received transmission blocks $y^{(i)}$. If the communication system 100 is a multicarrier system, a FEQ (Frequency Domain Equalizer) unit 434 can be arranged to adjust the phase and magnitude of the output of the demodulator unit 433 so that a common decision element can be used for the signals in all the carriers in subsequent processing of the received transmission blocks $y^{(i)}$. The modulated and possibly phase and/or magnitude adjusted output signal (represented by time discrete vector values) is multiplied with a diagonal matrix D in a dedicated unit 435. The diagonal matrix D will be described in detail below. The output of the diagonal matrix multiplying unit 335 is then fed to a modulo operator unit 436. The modulo operator unit 436 is arranged to operate in a manner equivalently to the modulo operator 342 of the transmitter part 110 so as to undo the fitting of the signal amplitude into the predetermined range [−M, M] achieved in the modulo operator 345 of the transmitter part 110.

The output of the modulo operator unit 436 is fed to a Hermitian operator unit 337. The Hermitian operator unit 437 is arranged to receive the input signal and provide an output, which is a real-valued signal. In one example, wherein the communication system is a DMT system, the Hermitian operator unit is arranged to provide a real-valued baseband transmit signal. Alternatively, the Hermitian operator is omitted. In one example, the Hermitian operator unit 337 is omitted in an OFDM system.

The operation of the receiver part 430 including the demodulator 433, FEQ 434, matrix D unit 435 and modulo operator unit 436 is in one example with a multicarrier receiver summed up by the following equation:

$$\hat{X}(k) = \mathrm{mod}_M((DEWy)(k)),$$

wherein k=1, . . . N, wherein the modulo operator $\mathrm{mod}_M$ represents the above described Tomlinson-Harashima precoding, wherein D is the diagonal matrix, wherein E is the equalizer and wherein W is the DFT matrix preferably implemented as FFT operation.

In an alternative example, with a single-carrier system, the corresponding operation of the receiver part 430 can be summed up as $$\hat{X}(k) = \mathrm{mod}_M((DW^H EWy)(k)).$$

Figure 5:
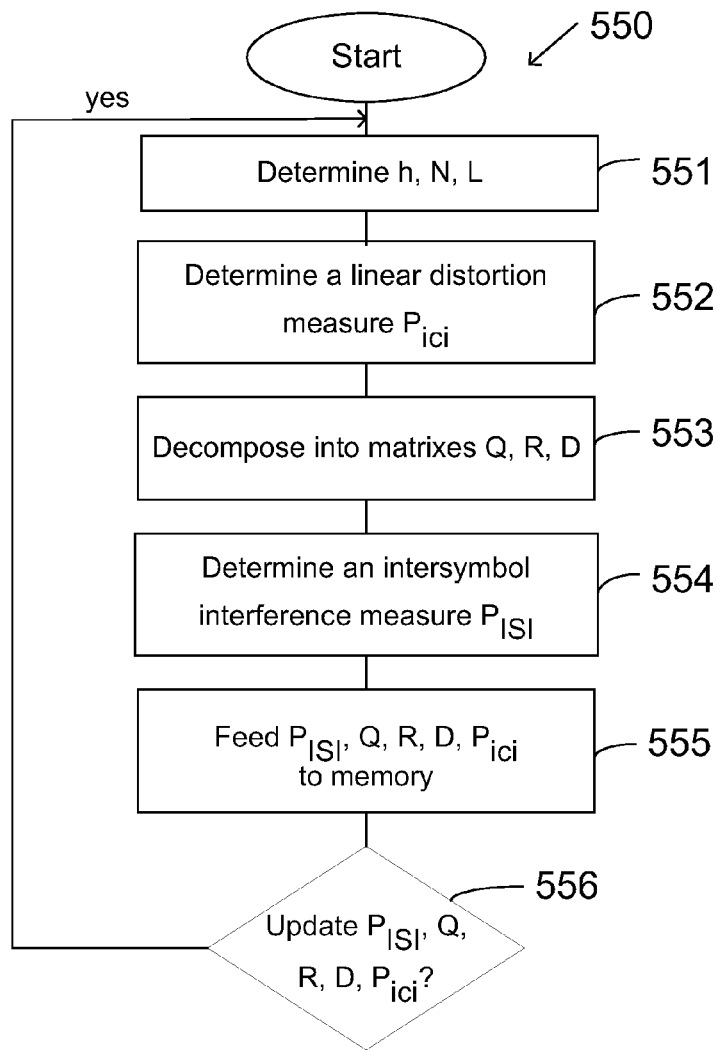
FIG. 5 is a flowchart schematically illustrating a method performed for initialization of a transmitter.

In FIG. 5, a method 550 for pre-processing data related to the transmission channel 120 for initialization of a transmitter part of a communication system comprises a number of steps, which will be described below. The initialization is performed once for a given channel state.

The initialization comprises in a first step 551 collecting information related to an impulse response h of the transmission channel 120, related to a symbol block length N of symbol blocks, which are to be transmitted over the transmission channel and the length L of a cyclic prefix. A preferred choice may be L=0, which yields a prefix-free system. Another choice may be L>0 but, in contrast to state-of-the-art systems, smaller than the dispersion of the channel (a prefix might be useful for synchronization or other reasons not related to channel dispersion).

In a second step 552, a first measure $P_{ici}$ of an intercarrier interference associated to the transmission channel 120 is calculated. The intercarrier interference measure $P_{ici}$ is in one example calculated as:

$$P_{ici} \triangleq TH^{-1}\tilde{H}T^H,$$

wherein T is a modulation matrix, H is a linear convolution matrix based on the impulse response h of the transmission channel 120, and $\tilde{H}$ is a circular convolution matrix based on the impulse response h of the transmission channel 120.

In a third step 553, the intercarrier interference measure $P_{ici}$ is decomposed into matrices Q, R and D. In one example, the decomposition step 553 involves decomposing the intercarrier interference measure $P_{ici}$ into a unitary matrix Q (i.e. $Q^{-1}=Q^H$), into an upper triangular matrix R for example with ones the main diagonal and into a diagonal matrix D. To sum up, in the third step 553, the intercarrier interference measure $P_{ici}$ is in one example decomposed in accordance with the equation $$QRD \triangleq P_{ici}$$

Methods which can be used for determining the values of the matrices Q, R and D are known in the art. For example, an iterative method is used in determining the matrices Q, R and D.

In a fourth step 554, a second measure $P_{isi}$ of an intersymbol interference associated to the transmission channel 120 is calculated. The intersymbol interference measure $P_{isi}$ is in one example calculated as:

$$P_{isi} \triangleq -TH^{-1}\hat{H},$$

wherein $$\hat{H} = \begin{cases} h_{\mathrm{mod}(k-l,N)+L}, & k \in 1, \ldots, N, l \in k+1, \ldots, N \\ 0, & \text{otherwise} \end{cases}$$

In a fifth step 555, the intercarrier interference measure $P_{ici}$, the intersymbol interference measure $P_{isi}$, and the matrices Q, R and D are stored in a memory available to a precoder for use by said precoder in processing symbol data.

As long as the length N of the symbol blocks is not altered and as long as the impulse response h of the channel and the length J of the guard interval is stable, the pre-processing method 550 does not need to be repeated. However, if it is detected in a sixth step 556, that $P_{ici}$, $P_{isi}$, Q, R and D need to be recalculated, the method 550 is repeated. The herein described steps, shown in FIG. 5, do not necessarily need to be performed in the order shown in the herein illustrated example.

In FIG. 6, a method 660 for providing a transmission block $t^{(i)}$ for transmission over a transmission channel 120 in a communication system comprises the following steps. In a first step 661, an inputted symbol block $x^{(i)}$ is received. The symbol block $x^{(i)}$ is in one example within a predetermined range [−M, M]. In a second step 662, the symbol block $x^{(i)}$ is pre-distorted based on an estimate of the characteristics of the transmission channel so that the corresponding transmission block $t^{(i)}$ appears to be undistorted after transmission over the transmission channel. This pre-distortion is achieved by carrying out modulo decisions based on Tomlinson-Harashima precoding $\text{mod}_M$ operations on a sum of a first measure ($R\xi$) corresponding to predistortion so as to remove intrasymbol interference and a second measure (q) corresponding to predistortion so as to remove intersymbol interference. In one example, the pre-distorted symbol block $\xi$ is recursively computed. In one detailed example, the pre-distortion is determined as $$\xi(k) \hat{=} \text{mod}_M(R(k,k:N)\xi(k:N)+q(k))-R(k,k+1:N)\xi(k+1:N)-q(k),$$

for $k=N:-1:1$, wherein initially $\xi$ is set as $\xi \hat{=} x^{(i)}$ and wherein $q \hat{=} Q^H P_{isi} t^{(i-1)}$ In a third step 663, the transmission block $t^{(i)}$ is then determined based on the predistorted symbol block $\xi$. In one example, the transmission block $t^{(i)}$ is determined by modulating the value for each position k of the predistorted symbol block $\xi$ with a transposed modulation matrix. In one example, the transmission block $t^{(i)}$ is determined as $$t^{(i)} \hat{=} T^H Q(R\xi+q)$$

In a fourth step 664, the transmission block $t^{(i)}$ determined in the preceding step is then fed to a transmitter for transmission over the transmission channel.

The invention claimed is:

1. Precoder for a communication system arranged to provide transmission blocks ($t^{(i)}$) for transmission over a transmission channel based on inputted symbol blocks ($x^{(1)}$) having a length N, said precoder being arranged to pre-distort each symbol block ($x^{(1)}$) based on an estimate of characteristics of the transmission channel so that a corresponding transmission block ($t^{(i)}$) appears to be undistorted after transmission over the transmission channel, wherein the precoder comprises:
   a memory; and
   a processor coupled to the memory and configured to retrieve pre-computed parameters from the memory,
   wherein the processor is arranged to use the retrieved pre-computed parameters to provide a first measure vector corresponding to predistortion so as to remove intrasymbol interference and a second measure (q) vector corresponding to predistortion so as to remove intersymbol interference, wherein the processor is configured to form a pre-distorted symbol block by applying Tomlinson-Harashima precoding on a sum vector formed as a sum of the first measure vector and the second measure vector (q), wherein the Tomlinson-Harashima precoding is performed N times on the sum vector starting with k=N and down to k=1, wherein N is an integer and wherein for each of the N times, the first measure vector is updated, and wherein the processor is configured to form a corresponding transmission block ($t^{(i)}$) from the pre-distorted symbol block.

2. The precoder according to claim 1, wherein each symbol block ($x^{(i)}$) is within a predetermined range and wherein the precoder is arranged to predistort each symbol block ($x^{(i)}$) based on the Tomlinson-Harashima precoding so as to map the thus provided transmission block ($t^{(i)}$) into the predetermined range.

3. The precoder according to claim 1, wherein the second measure (q) is based on an intersymbol interference measure ($P_{isi}$) for the transmission channel and a preceding transmission block ($t^{(i-1)}$).

4. The precoder according to claim 1, wherein the first measure is based on an intrasymbol measure ($P_{ici}$) and the inputted symbol block ($x^{(i)}$).

5. The precoder according to claim 4, wherein the first measure is based on a matrix (R) decomposed from the intrasymbol measure ($P_{ici}$) and on the inputted symbol block ($x^{(i)}$).

6. The precoder according to claim 1, wherein the precoder is arranged to recursively calculate for each inputted symbol block ($x^{(i)}$) an intermediate symbol block ($\xi$) as $$\xi(k) \hat{=} \text{mod}_M(R(k,k:N)\xi(k:N)+q(k))-R(k,k+1:N)\xi(k+1:N)-q(k),$$

wherein the intermediate symbol block ($\xi$) is initially assigned to the value of the inputted symbol block ($x^{(i)}$), wherein R is a matrix decomposed from an intrasymbol measure ($P_{ici}$), wherein $\text{mod}_M$ is a modulo operator that represents the Tomlinson-Harashima precoding, wherein N represents symbol block length and where k=N:−1:1 and wherein q is the second measure.

7. The precoder according to claim 6, wherein the precoder is arranged to determine each transmission block $t^{(i)}$ based on the intermediate symbol block ($\xi$) and based on a transposed modulation matrix.

8. The precoder according to claim 1, comprising a pre-processor arranged to determine an intersymbol interference measure ($P_{isi}$) and an intrasymbol interference measure ($P_{ici}$) based on the estimate of the characteristics of the transmission channel.

9. The precoder according to claim 8, wherein the unit pre-processor is arranged to decompose the intrasymbol interference measure ($P_{ici}$) into a plurality of matrices (Q, R, D), wherein one first matrix (R) is an upper triangular matrix.

10. The precoder according to claim 9, wherein the unit pre-processor is arranged to decompose the intrasymbol interference measure ($P_{ici}$) into at least three matrices (Q, R, D), wherein one second matrix (Q) is unitary and one third matrix (D) is diagonal.

11. A transmitter part for the communication system comprising the precoder according to claim 1.

12. The communication system comprising the transmitter part according to claim 11.

13. The communication system according to claim 12, comprising a receiver arranged to provide decoded symbol blocks ($\hat{x}^{(i)}$) based on received transmission blocks ($y^{(i)}$) transmitted over the transmission channel.

14. The communication system according to claim 13, wherein the receiver is arranged to calculate each decoded symbol block ($\hat{x}^{(i)}$) as $$\hat{x}(k) \hat{=} \text{mod}_M(Py)(k)$$

wherein $\text{mod}_M$ is the Tomlinson-Harashima precoding ($\text{mod}_M$) operator, and wherein P is based on an intrasymbol interference measure ($P_{ici}$) for the transmission channel.

15. The communication system according to claim 14, wherein the receiver is arranged for a multicarrier communication system and wherein P is defined as P=D E W, wherein D is based on an intrasymbol interference measure ($P_{ici}$) for the transmission channel, E is an equalizer and W is a modulation matrix.

16. The communication system according to claim 14, wherein the receiver is arranged for a single carrier communication system and wherein P is defined as P=D $W^H$ E W, wherein D is based on an intrasymbol interference measure ($P_{ici}$) for the transmission channel, E is an equalizer, W is a modulation matrix, and $W^H$ is a transposed conjugate of the modulation matrix W.

17. The communication system according to claim 15, wherein D is a diagonal matrix.

18. The communication system according to claim 12, wherein the communication system is a multicarrier system.

19. The communication system according to claim 12, wherein the communication system is a blocked single carrier system.

20. Method for providing transmission blocks ($t^{(i)}$) for transmission over a transmission channel in a communication system, comprising the following steps:

receiving inputted symbol blocks ($x^{(i)}$), each symbol block ($x^{(i)}$) having a length N and being within a predetermined range, forming pre-distorted symbol blocks by pre-distorting each symbol block ($x^{(i)}$) based on an estimate of characteristics of the transmission channel so that a corresponding transmission block ($t^{(i)}$) appears to be undistorted after transmission over the transmission channel, and forming the transmission blocks ($t^{(i)}$) from the pre-distorted symbol blocks, wherein the pre-distortion step comprises:

applying N times, starting with k=N and down to k=1, wherein N is an integer, for each symbol block Tomlinson-Harashima precoding on a sum of a first measure vector corresponding to predistortion so as to remove intrasymbol interference and a second measure (q) vector corresponding to predistortion so as to remove intersymbol interference; and for each of the N times, updating the first measure vector.

* * * * *

UNITED STATES PATENT AND TRADEMARK OFFICE
CERTIFICATE OF CORRECTION

PATENT NO. : 8,848,811 B2
APPLICATION NO. : 13/058330
DATED : September 30, 2014
INVENTOR(S) : Rius I Riu et al.

It is certified that error appears in the above-identified patent and that said Letters Patent is hereby corrected as shown below:

Specification

In Column 2, Line 22, delete "$(P_{ici})$" and insert -- $(P_{isi})$ --, therefor.

Claims

In Column 9, Line 34, in Claim 1, delete "Precoder" and insert -- A precoder --, therefor.

In Column 9, Line 36, in Claim 1, delete "$(X^{(1)})$" and insert -- $(X^{(i)})$ --, therefor.

In Column 9, Line 38, in Claim 1, delete "$(X^{(1)})$" and insert -- $(X^{(i)})$ --, therefor.

In Column 10, Line 33, in Claim 9, delete "wherein the unit" and insert -- wherein the --, therefor.

In Column 10, Line 37, in Claim 10, delete "wherein the unit" and insert -- wherein the --, therefor.

In Column 11, Line 10, in Claim 20, delete "Method" and insert -- A method --, therefor.

Signed and Sealed this
Twenty-seventh Day of October, 2015

Michelle K. Lee
*Director of the United States Patent and Trademark Office*